(No Model.)

C. L. RIDGWAY.
HEATING STOVE OR FURNACE.

No. 391,274. Patented Oct. 16, 1888.

Witnesses,
Arthur Ashley.
James F. DuHamel.

Inventor,
Charles L. Ridgeway.
Clarke & Raymond, attys.

UNITED STATES PATENT OFFICE.

CHARLES L. RIDGWAY, OF BOSTON, MASSACHUSETTS, ASSIGNOR TO THE RIDGWAY FURNACE AND STOVE COMPANY, OF NASHUA, NEW HAMPSHIRE.

HEATING STOVE OR FURNACE.

SPECIFICATION forming part of Letters Patent No. 391,274, dated October 16, 1888.

Application filed July 27, 1885. Serial No. 172,750. (No model.)

*To all whom it may concern:*

Be it known that I, CHARLES L. RIDGWAY, of Boston, in the county of Suffolk and State of Massachusetts, a citizen of the United States, have invented a new and useful Improvement in Heating Stoves or Furnaces, of which the following is a full, clear, and exact description, reference being had to the accompanying drawings, forming a part of this specification, in explaining its nature.

The invention is an improvement upon that which is described in my patent, No. 281,795, dated July 24, 1883. In the said patent I have described a basket or open fire-pot wall contained within a chamber connected with the combustion-chamber and forming a part thereof, which wall is adapted to be revolved, and which is surrounded by a partition-plate forming the division between the ash-pit chamber and this downward extension to the combustion-chamber. In the present invention the fire-pot wall is of a similar form to that described in my said patent in that it has vertical openings; but it differs therefrom in that it is stationary, and in that the plate which surrounds its lower edge is arranged to be revolved to transfer the ashes which fall outward through the openings of the fire-pot wall thereon to a place from which they can be precipitated into the ash-pit.

The invention relates also to various details of construction, all of which will hereinafter be fully described.

Figure 1:
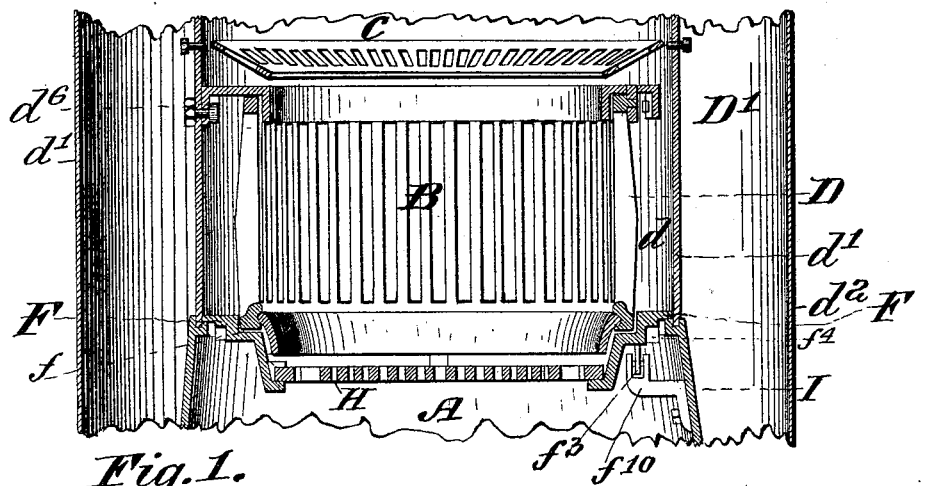
Figure 2:
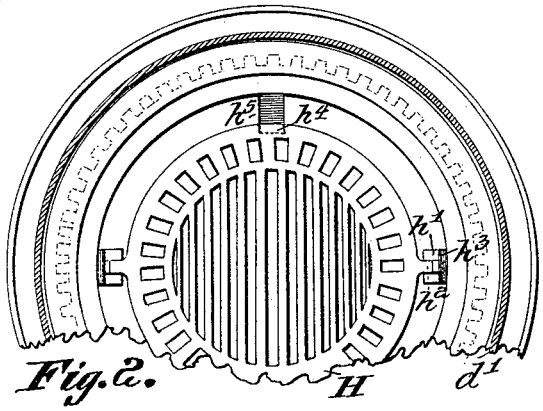
Figure 3:
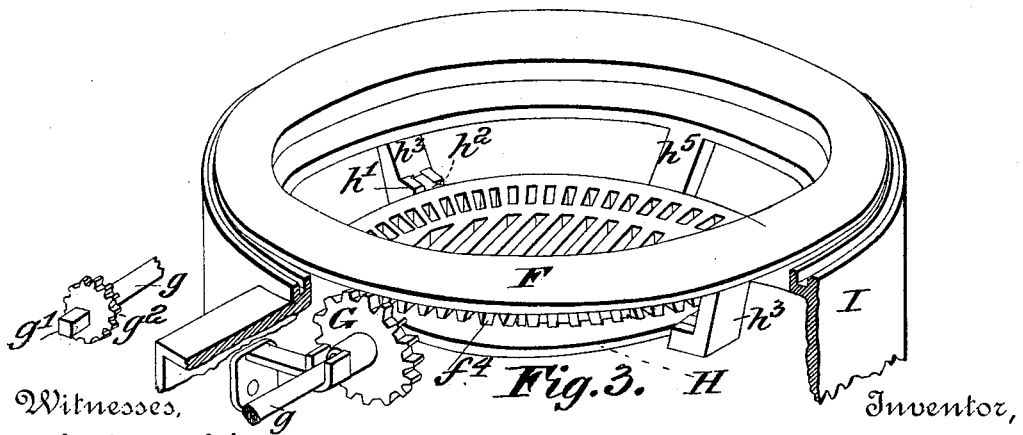

In the drawings, Figure 1 is a central vertical section of a portion of a furnace having my improvements. Fig. 2 is a horizontal section taken through the combustion-chamber in a line above the top of the fire-pot and representing in plan the parts below such line. Fig. 3 is a view in perspective, enlarged, of the grate, the revolving plate, and other parts to which reference is hereinafter made.

A is the ash-pit; B, the fire-pot; C, the combustion-chamber; D, the fire-pot wall; $d$, the portion of the combustion-chamber about the fire-pot; $d'$, the inner casing of the furnace, which incloses the combustion-chamber and forms, in connection with the fire-pot and its attachments, the chamber $d$; $d^2$, the outer casing of the furnace, and D' the heating or hot-air chamber of the furnace.

The fire-pot wall as here represented is similar in construction to that described in my application for Letters Patent of the United States filed July 27, 1885, Serial No. 172,751, the fire-pot being supported within the chamber $d$ by means of brackets or supports $d^6$, which extend inward from the casing $d'$, and are fastened to the upper edge of the fire-pot wall. For the purposes of this invention, however, the means described for suspending the fire-pot wall are not essential, as various other means for effecting such suspension may be employed, and it will be understood that I do not herein claim the suspending mechanism above referred to.

Extending about the lower extremity of the fire-pot wall is the plate F, which in its upper surface and inner periphery is provided with a continuous recess, $f$, to receive the lower edge of the fire-pot wall. The plate F is sustained by anti-friction rollers or supports $f^3$, which are carried by suitable brackets or holders, $f^{10}$, which extend inward from the wall I of the ash-pit chamber. The plate F has cogs or teeth $f^4$ upon its under surface, and it should be made to fit the space between the lower edge of the fire-pot wall and the inner casing of the furnace as snugly as possible, in order to prevent air from entering the chamber $d$ too freely, as it is desirable that very little, if any, air be allowed to enter this chamber directly from the ash-pit chamber.

Arranged below the plate F in the ash-pit chamber is the pinion G, which is mounted upon the shaft $g$, and is arranged to engage with the teeth or cogs $f^4$ of the plate F. The shaft is supported in suitable bearings in a fixed part of the furnace, and its outer end extends without the furnace, and is adapted to receive a crank or a chain, (both not shown,) the former being applied upon the squared end $g'$ and the latter upon the pinion $g^2$ of the shaft. The plate F also supports the grate H, which is provided with pivots or trunnions $h^2$, which rest in recesses in horizontal ledges $h'$ at the lower ends of brackets $h^3$, which, as best seen in Fig. 3, depend from said plate F, so that upon the revolution of such plate the grate also is caused to be revolved. The grate is also adapted to be tilted or dumped, turning upon its pivots to discharge its contents wholly or in part. When in its ordinary horizontal position, it is additionally supported by the stop or projection $h^4$ upon the arm or bracket $h^5$, which extends downward from the plate F to a position below the grate and on a line with its pivots or trunnions $h^2 h^2$. The grate is preferably so hung or arranged in relation to the lower edge of the fire-pot wall as to provide a sufficient lateral opening for the removal of clinkers or for the "slicing" of the fire, as it is sometimes called.

It will be seen that by making the fire-pot wall stationary and the grate revoluble there is exerted upon the contents of the fuel-chamber a torsional or grinding action, which quickly breaks up clinkers and other foreign substances, and causes all the finer portions of the same, together with the ashes resulting from combustion, to be rapidly discharged. It will also be noted that as the burning fuel rests upon the grate it is to a certain extent revolved with it, and that ashes are caused to be discharged from the fire-pot through interstices in the walls thereof and upon the upper surface of the plate F.

The vertical spaces or interstices of the fire-pot wall may be of any desired length and arrangement—that is, they may extend from the top of the fire-pot wall to the bottom thereof, as represented in Fig. 1, or they may extend only a portion of the distance from the upper extremity, the remainder of the fire-pot wall being solid or imperforate.

Although I have incidentally shown and described a chain-pinion upon the exterior end of the operating-shaft, I do not herein broadly claim the same, since it forms an element in the construction described and claimed in application serially numbered 193,579, filed by me in the United States Patent Office on the 1st day of March, 1886.

Having thus fully described my invention, I claim and desire to secure by Letters Patent of the United States—

1. The combination of the stationary fire-pot wall D with the revoluble plate F, all substantially as described.

2. The combination of the stationary fire-pot D, the rotary plate F, and a rotary grate, all substantially as described.

3. The combination of a stationary fire-pot, a rotary plate, F, a grate, and devices connecting the grate with the plate F, whereby upon the movement of the plate the grate is caused to be revolved, all substantially as described.

4. The combination of a fire-pot, the movable plate F, and an anti-friction support for holding the same, all substantially as described.

5. The combination of a suspended fire-pot wall, the chamber $d$, the rotary plate F, and the grate H, substantially as described.

6. The combination of the stationary fire-pot having side openings, spaces, or interstices, the chamber $d$, and a rotary grate, substantially as described.

7. The combination of a stationary fire-pot, a rotary grate-support, and a tilting or tipping grate attached thereto, all substantially as described.

8. The combination of the stationary fire-pot, the rotary plate F, and devices for rotating said plate, adapted to be operated from a point without the furnace, all substantially as described.

9. The combination of the rotary plate F, anti-friction supports, the cogs or teeth $f^4$, pinion G, and shaft $g$, all substantially as described.

10. The combination, with the wall or body, as $d'$, of a combustion-chamber, of supporting-brackets which extend inwardly from such body or wall, anti-friction supports upon the supporting-brackets, a recessed and toothed annular plate upon the anti-friction supports, a grate upon the annular plate, a fire-pot wall or cylinder which by its upper portion is non-rotatably suspended from the wall or body of the combustion-chamber, and which by its lower portion extends into the recess in the annular plate, and an operating-shaft which is supported in a fixed portion of the furnace, and which engages the teeth upon the annular plate, substantially as and for the purposes specified.

11. The combination of a non-revoluble fire-pot wall which is supported by its upper portion within a combustion-chamber, with a separate and independent revoluble plate which supports a grate, substantially as described.

12. The combination, with the body or shell of a combustion-chamber, of a fixed fire-pot wall which is suspended from such shell and has close connection therewith, and a revoluble grate supporting plate at the lower extremity of but separate from the fire-pot wall, which also has close connection with and is supported by the wall or shell of the combustion-chamber, whereby an encircling-chamber is formed around the fire-pot, substantially as and for the purposes described.

CHARLES L. RIDGWAY.

Witnesses:
F. F. RAYMOND, 2d,
FRED. B. DOLAN.